(12) United States Patent
Dyer et al.

(10) Patent No.: US 11,543,824 B2
(45) Date of Patent: Jan. 3, 2023

(54) QUEUEING INTO PICKUP AND DROP-OFF LOCATIONS

(71) Applicant: Waymo LLC, Mountain View, CA (US)

(72) Inventors: John Wesley Dyer, Mountain View, CA (US); Michael Epstein, Danville, CA (US)

(73) Assignee: Waymo LLC, Mountain View, CA (US)

( * ) Notice: Subject to any disclaimer, the term of this patent is extended or adjusted under 35 U.S.C. 154(b) by 176 days.

(21) Appl. No.: 16/154,829

(22) Filed: Oct. 9, 2018

(65) Prior Publication Data

US 2020/0111370 A1 Apr. 9, 2020

(51) Int. Cl.
*G05D 1/02* (2020.01)
*B60W 60/00* (2020.01)

(52) U.S. Cl.
CPC ..... *G05D 1/0214* (2013.01); *B60W 60/00253* (2020.02); *B60W 2554/406* (2020.02); *G05D 2201/0212* (2013.01)

(58) Field of Classification Search
CPC combination set(s) only.
See application file for complete search history.

(56) References Cited

U.S. PATENT DOCUMENTS

| | | | |
|---|---|---|---|
| 9,547,307 B1 | 1/2017 | Cullinane et al. | |
| 9,805,605 B2 | 10/2017 | Ramanujam | |
| 9,911,084 B2 | 3/2018 | Bryson et al. | |
| 10,403,133 B1* | 9/2019 | Christensen | G08G 1/096844 |
| 10,466,057 B1* | 11/2019 | Schwie | G06N 20/00 |
| 10,559,197 B2* | 2/2020 | Yang | G08G 1/0133 |
| 2013/0018572 A1* | 1/2013 | Jang | G08G 1/164 |
| | | | 701/119 |
| 2015/0312529 A1* | 10/2015 | Bernal | G06K 9/00785 |
| | | | 348/148 |

(Continued)

FOREIGN PATENT DOCUMENTS

| | | |
|---|---|---|
| KR | 20180101079 A | 9/2018 |
| WO | 2017155740 A1 | 9/2017 |

(Continued)

OTHER PUBLICATIONS

International Search Report and Written Opinion for Application No. PCT/US2019/053821 dated Jan. 15, 2020.

(Continued)

*Primary Examiner* — Anne Marie Antonucci
*Assistant Examiner* — Amelia Vorce
(74) *Attorney, Agent, or Firm* — Botos Churchill IP Law

(57) ABSTRACT

Aspects of the disclosure provide for controlling an autonomous vehicle to respond to queuing behaviors at pickup or drop-off locations. As an example, a request to pick up or drop off a passenger at a location may be received. The location may be determined to likely have a queue for picking up and dropping off passengers. Based on sensor data received from a perception system, whether a queue exists at the location may be determined. Once it is determined that a queue exists, it may be determined whether to join the queue to avoid inconveniencing other road users. Based on the determination to join the queue, the vehicle may be controlled to join the queue.

25 Claims, 11 Drawing Sheets

(56) References Cited

U.S. PATENT DOCUMENTS

| | | | |
|---|---|---|---|
| 2016/0370194 A1* | 12/2016 | Colijn | G01C 21/34 |
| 2017/0169535 A1* | 6/2017 | Tolkin | G06Q 10/06311 |
| 2017/0219362 A1 | 8/2017 | Bryson et al. | |
| 2017/0277191 A1 | 9/2017 | Fairfield et al. | |
| 2018/0102017 A1* | 4/2018 | Brinig | G06K 7/1095 |
| 2018/0136656 A1* | 5/2018 | Rasmusson, Jr. | G05D 1/0246 |
| 2018/0322775 A1* | 11/2018 | Chase | G07C 5/008 |
| 2019/0047584 A1* | 2/2019 | Donnelly | G05D 1/0088 |
| 2019/0066515 A1* | 2/2019 | Dyer | G05D 1/0212 |
| 2019/0137290 A1* | 5/2019 | Levy | B60Q 1/50 |
| 2019/0163204 A1* | 5/2019 | Bai | G06Q 10/047 |
| 2019/0171209 A1* | 6/2019 | Lee | G08G 1/144 |
| 2019/0178656 A1* | 6/2019 | Stegall | G01C 21/3415 |
| 2019/0196482 A1* | 6/2019 | Reiley | B60Q 5/006 |
| 2019/0250626 A1* | 8/2019 | Ghafarianzadeh | B60K 31/0008 |
| 2019/0258246 A1* | 8/2019 | Liu | G05D 1/0038 |
| 2019/0311629 A1* | 10/2019 | Sierra | G06Q 10/02 |
| 2019/0377343 A1* | 12/2019 | Chan | G06K 9/00812 |
| 2019/0384294 A1* | 12/2019 | Shashua | G06K 9/00798 |
| 2019/0385442 A1* | 12/2019 | Perez Barrera | G08G 5/0069 |
| 2020/0058092 A1* | 2/2020 | Buttolo | G06Q 30/0281 |
| 2020/0166897 A1* | 5/2020 | Campos | G06K 9/00805 |

FOREIGN PATENT DOCUMENTS

| | | |
|---|---|---|
| WO | 2018071266 A1 | 4/2018 |
| WO | 2018132088 A1 | 7/2018 |

OTHER PUBLICATIONS

Marc Segal and Kara M. Kockelman. Design and Implementation of a Shared Autonomous Vehicle System in Austin, Texas. Published in 2016. pp. 1-18.

The Extended European Search Report for European Patent Application No. 19871164.0, dated May 3, 2022.

* cited by examiner

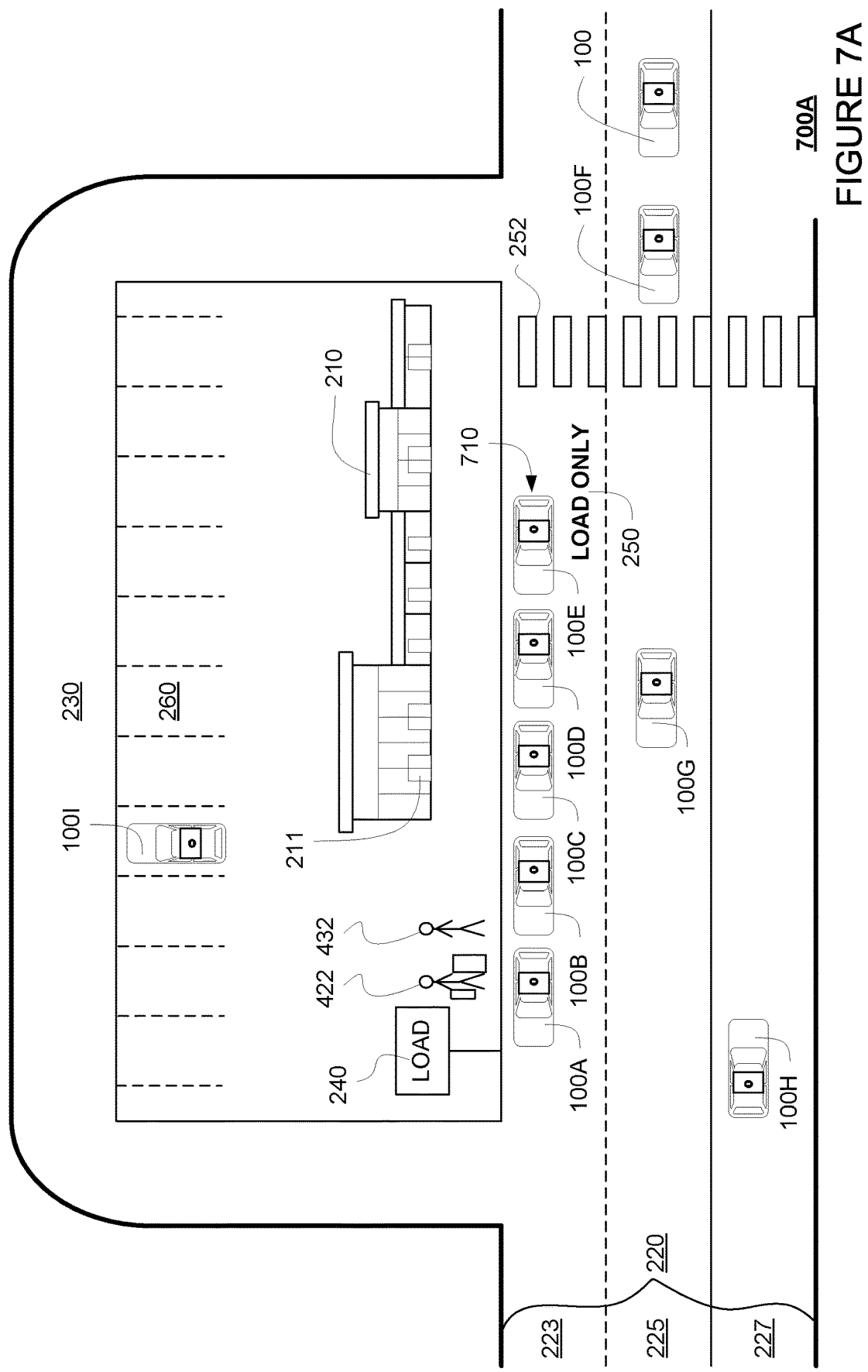

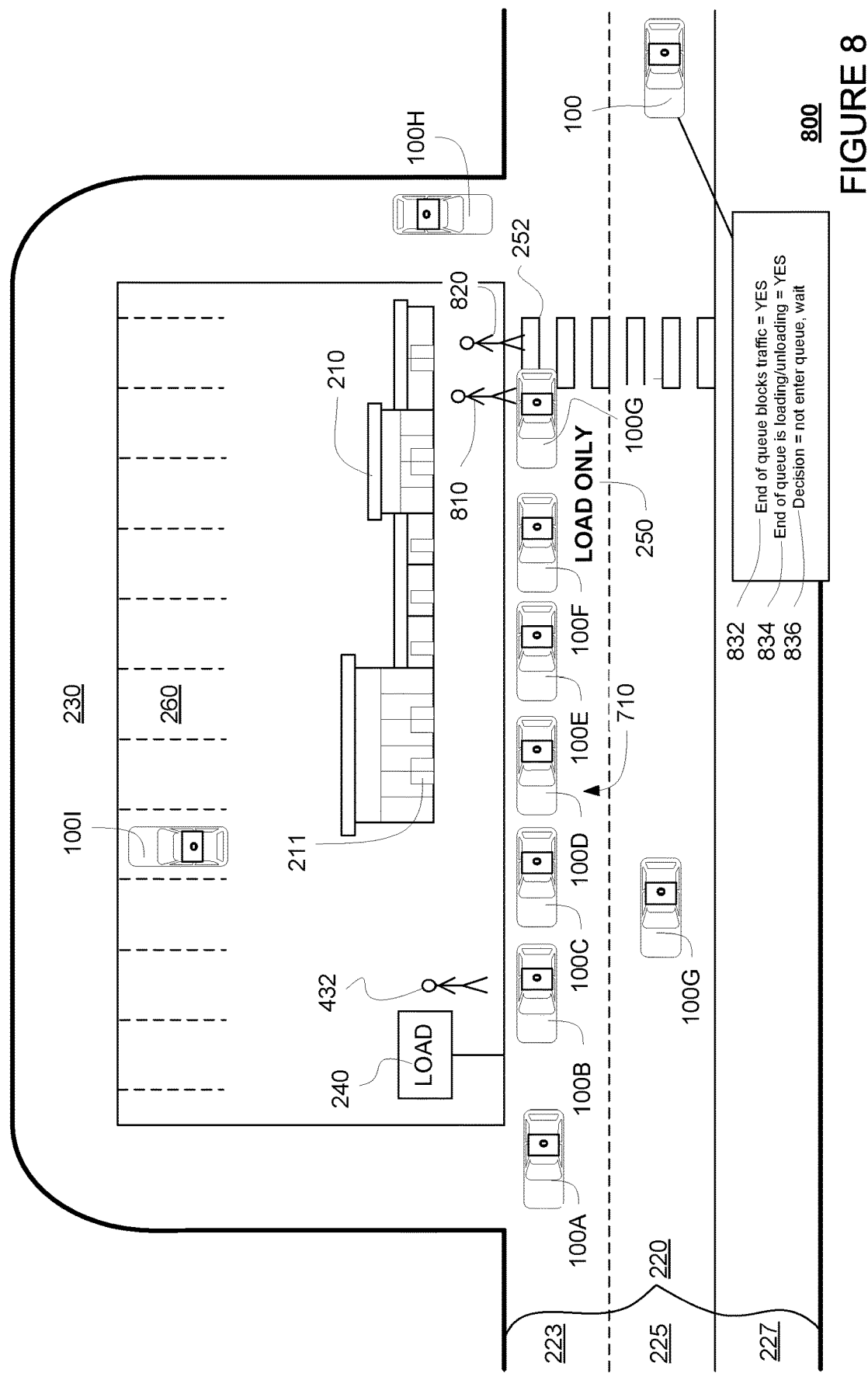

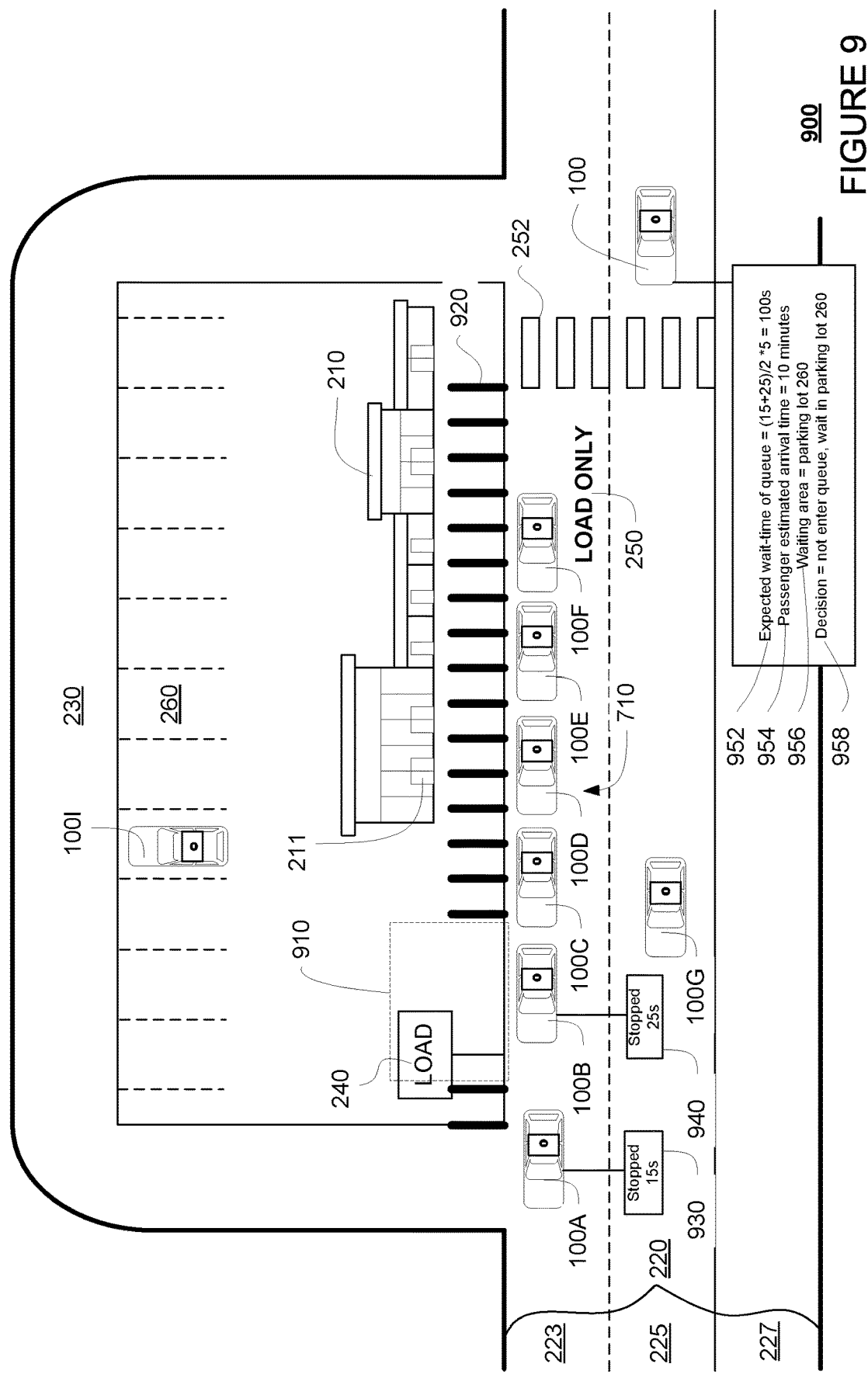

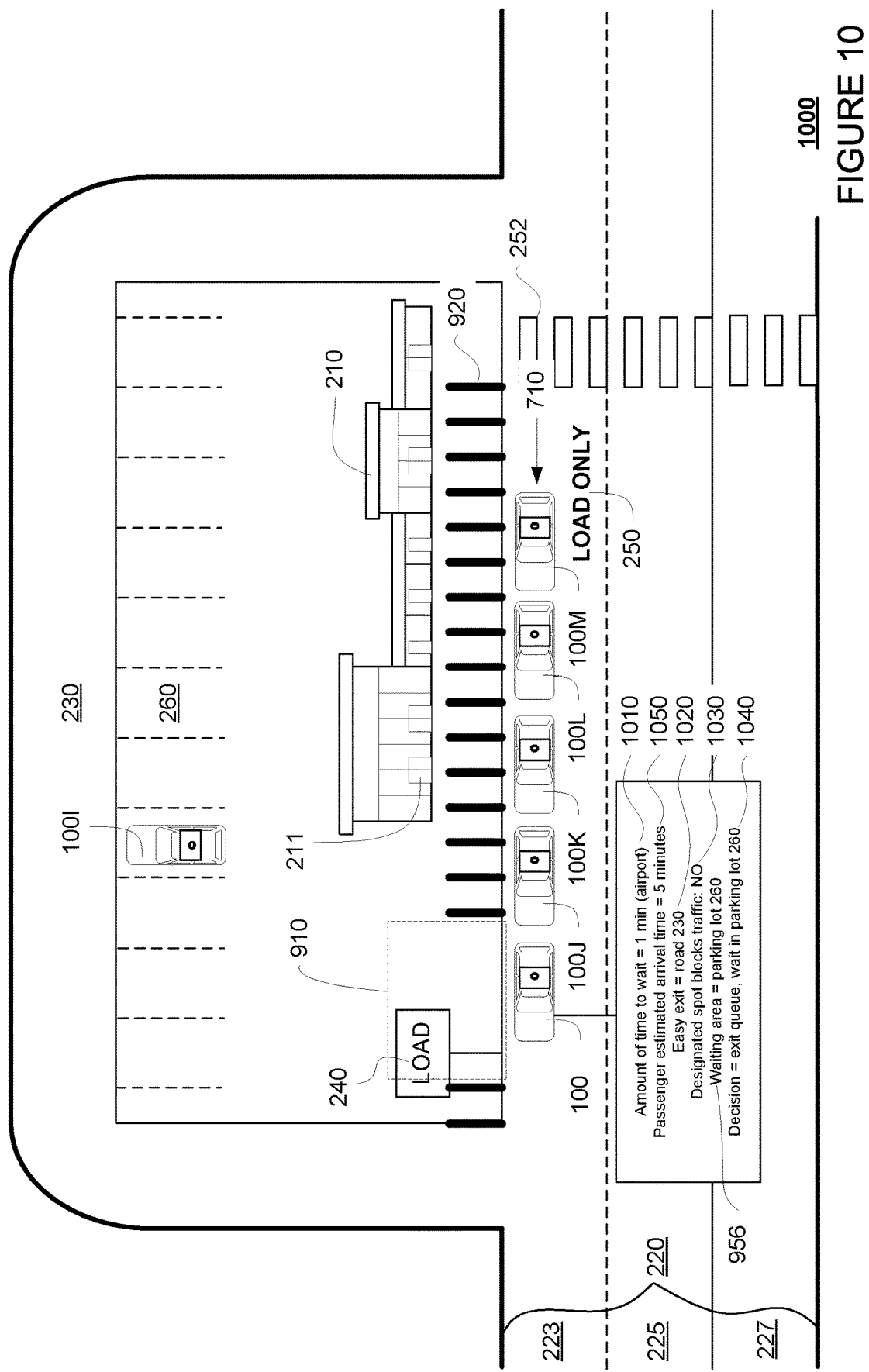

QUEUEING INTO PICKUP AND DROP-OFF LOCATIONS

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or drop-off location, and the vehicle maneuvers itself to that location.

When a person (or user) wants to be physically transported between two locations via a vehicle, they may use any number of transportation services. To date, these services typically involve a human driver who is given dispatch instructions to a location to pick up the user. In many cases, the location may have a queue for picking up or dropping off passengers. For example, a human driver would likely know that locations such as airports and train stations typically have a queue for picking up or dropping off passengers. Further, a human driver typically knows from experience the common practices and rules of such queues, and could intuitively respond to queuing behaviors of other vehicles. As such, a human driver may be able to determine how to best reduce inconvenience to other drivers in and around the queue. This is not readily achievable in the case of autonomous vehicles which do not have a human driver.

BRIEF SUMMARY

Aspects of the disclosure provides receiving, by one or more processors, a request to pick up or drop off a passenger at a location; determining, by the one or more processors, that the location is likely to have a queue for picking up and dropping off passengers; determining, by the one or more processors based on sensor data received from a perception system, that a queue exists at a pick-up and drop-off spot at the location; determining, by the one or more processors based on the sensor data, whether to join the queue to avoid inconveniencing other road users; and controlling, by the one or more processors, the vehicle in order to join the queue based on the determination to join the queue.

Determining whether a queue exists at the location may be based on traffic patterns observed from the sensor data. Determining whether a queue exists at the location may be based on changes in traffic patterns observed using a time series of the sensor data. Determining whether a queue exists at the location may be based on signs detected using the sensor data, wherein the signs are within a predetermined distance of the traffic patterns.

The method may further comprise determining, by the one or more processors based on the sensor data, whether the vehicle would block traffic if the vehicle joins the queue; wherein determining whether to join the queue may be based on whether the vehicle would block traffic if the vehicle joins the queue. The method may further comprise determining, by the one or more processors based on the sensor data, whether the vehicle would interfere with loading or unloading by another vehicle if the vehicle joins the queue; wherein determining whether to join the queue may be based on whether the vehicle would interfere with the loading or unloading by another vehicle if the vehicle joins the queue.

The method may further comprise determining, by the one or more processors based on the sensor data, a designated spot in the queue for loading and unloading passengers, and controlling, by the one or more processors, the vehicle to move along in the queue to reach the designated spot. The method may further comprise determining, by the one or more processors based on the sensor data, that loading or unloading outside the designated spot is tolerated by other vehicles in the queue, and controlling, by the one or more processors, the vehicle to perform pickup or drop-off outside the designated spot. The method may further comprise determining, by the one or more processors based on the sensor data, that the queue has multiple lanes; and controlling, by the one or more processors, the vehicle to shift to a lane closest to the designated spot.

The method may further comprise predicting, by the one or more processors based on the sensor data, an expected wait-time for the vehicle to reach the designated spot in the queue; and sending, by the one or more processors, a message to a client computing device of the passenger indicating that the vehicle is waiting in the queue to pick up the passenger at the designated spot, the message including the expected wait-time. The method may further comprise predicting, by the one or more processors based on the sensor data, an expected wait-time for the vehicle to reach the designated spot in the queue; and providing, by the one or more processors based on the sensor data, a message to the passenger to wait for the vehicle to reach the designated spot before getting out of the vehicle, the message including the expected wait-time.

The method may further comprise predicting, by the one or more processors based on the sensor data, an expected wait-time for the vehicle to reach the designated spot in the queue; and predicting, by the one or more processors, an estimated arrival time for a passenger requesting pickup at the location to reach the designated spot; wherein determining whether to join the queue may be based on a comparison between the expected wait-time and the estimated arrival time. The method may further comprise determining, by the one or more processors based on the comparison between the expected wait-time and the estimated arrival time, to wait in a waiting area prior to joining the queue; and controlling, by the one or more processors, the vehicle to park in the waiting area prior to joining the queue.

The method may further comprise determining, by the one or more processors upon reaching the designated spot in the queue, an amount of time to wait for the passenger at the designated spot based on a level of difficulty for exiting and re-joining the queue; and controlling, by the one or more processors, the vehicle to exit the queue after waiting the amount of time. The method may further comprise determining, by the one or more processors upon reaching the designated spot in the queue, an amount of time to wait for the passenger at the designated spot based on whether the vehicle is blocking traffic at the designated spot; and controlling, by the one or more processors, the vehicle to exit the queue after waiting the amount of time.

The method may further comprise determining, by the one or more processors upon reaching the designated spot in the queue, an estimated arrival time for the passenger to reach the designated spot; based on the estimated arrival time, controlling the vehicle to exit the queue; predicting, by the one or more processors, an expected wait-time to reach the designated spot after exiting the queue; determining, by the one or more processors to return to the queue after exiting the queue based on a comparison between the estimated arrival time and the expected wait-time; and controlling, by the one or more processors, the vehicle to drive to return to the queue after exiting the queue. The method may further comprise sending, by the one or more processors, a message to a user device of the passenger indicating that the vehicle is returning to an end of the queue, the message including the expected wait-time. The method may further comprise determining, by the one or more processors based on the comparison between the estimated arrival time and the expected wait-time, to wait in a waiting area prior to returning to the queue; and controlling, by the one or more processors, the vehicle to park in the waiting area prior to returning to the queue.

The method may further comprise determining, by the one or more processors that the location has a plurality of designated pickup or drop-off areas; selecting, by the one or more processors, one of the designated pickup or drop-off areas; and controlling, by the one or more processors, the vehicle to drive to the selected designated pickup or drop-off area. Selecting one of the designated pickup or drop-off areas may be based on feedback received from a user device, the feedback associated with the passenger identifying a preferred spot for pickup or drop-off.

BRIEF DESCRIPTION OF THE DRAWINGS

FIGS. 7A-10 are examples of various situations in accordance with aspects of the disclosure.

DETAILED DESCRIPTION

Overview

Figure 1:
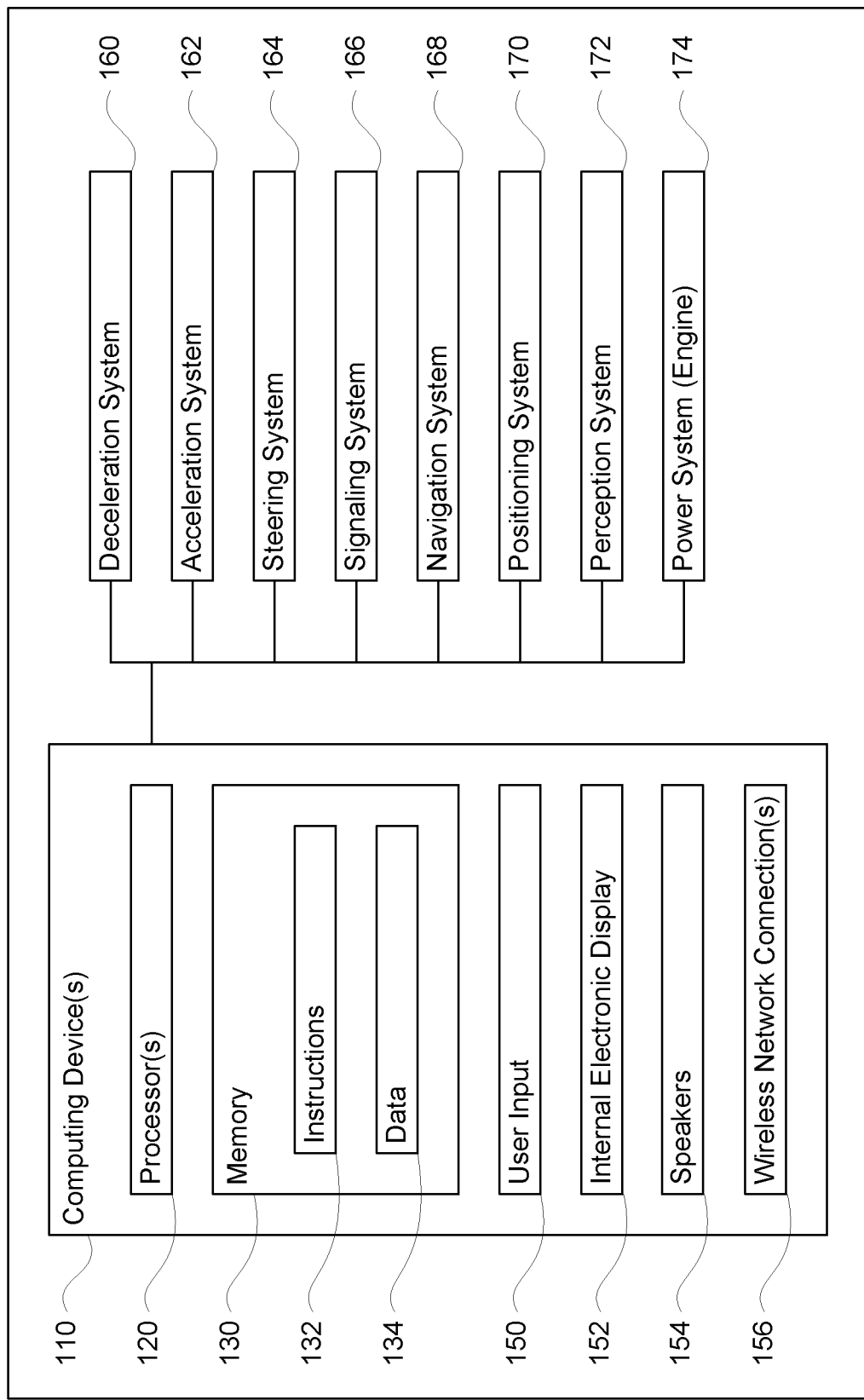
FIG. 1 is a functional diagram of an example vehicle in accordance with aspects of the disclosure.

The technology relates to an autonomous vehicle's behaviors for queuing into a line of vehicles in order to perform a pickup or drop-off of goods and/or passengers. As noted above, autonomous vehicles do not have intuition to recognize and respond to queuing behaviors, and thus likely to behave in a manner that inconvenience or annoy other road users. For instance, if there is a designated spot in the queue (such as front of the queue) for picking up passengers, it may cause inconvenience or annoyance to the passenger and other road users if the autonomous vehicle performs the pickup at another spot in the queue (such as the middle of the queue). For another instance, if the vehicle waits too long at the designated pickup spot in the queue, or re-queues many times before the passenger arrives, this may slow down the queue and therefore inconvenience other vehicles in the queue. Such inappropriate behaviors by the autonomous vehicle may cause traffic congestion or even unsafe conditions for other road users, and thus need to be addressed.

One option is to have an autonomous vehicle request assistance from remote operators. For instance, the remote operators may provide instructions to the vehicle to indicate whether and how the autonomous vehicle should enter a queue to wait for a passenger. Once in the queue, a remote operator may indicate where in the queue should the vehicle pickup the passenger, and if the passenger is not there, whether the vehicle should continue to wait in the queue or leave and re-queue, etc. The remote operator may do so by reviewing the vehicle's surroundings and then direct the vehicle based on considerations for the passenger and other road users. However, this back-and-forth with the remote operator can take time, which can cause further annoyance and inconvenience to the passenger and other road users. To reduce or even eliminate the need for the autonomous vehicles to call a remote operator in such situations, the vehicle's computing devices may determine various circumstances of the queue and control the vehicle accordingly.

In this regard, the vehicle may receive a request to pickup or drop off a passenger at a location. In response, the vehicle controls itself in order to maneuver to the location using map information (for example including GPS coordinates). While doing so, the vehicle's computer receives sensor data from the perception system in order to detect, identify and respond to objects including road users (vehicles, bicycles, and passengers), barriers, and signs.

The vehicle's computing devices may determine whether the location is likely to have a queue. For example, the vehicle's computing devices may determine, based on map information indicating that the location is an airport or a stadium with a scheduled sporting event, that the location is likely to have a queue for passenger pickup and/or drop-off. If so, the vehicle's computing devices may activate processes to determine if a queue actually exists at the time, and to determine appropriate queuing behaviors for the queue.

If the vehicle's computing devices determine that the location is likely to have a queue, as the vehicle approaches the location, the vehicle's computing devices uses sensor data from the perception system to determine whether there is a queue for pickups or drop-offs at the location. For instance, by identifying traffic patterns and changes in these traffic patterns over time from the sensor data, the vehicle's computing devices may then determine whether a queue actually exists at the location. In order to allow the vehicle's computing devices to quickly assess these traffic patterns, a model may be trained to receive the sensor data described above as input, and output whether any traffic pattern is identified as a queue. The model may be trained by using sensor data generated by a vehicle's perception system with labeled instances of when a queue is identified.

Once a queue for pickups or drop-offs is identified at the location, the vehicle's computing devices may determine whether to join the queue. For instance, the vehicle's computing devices may determine based on sensor data whether entering the queue would inconvenience other road users, such as blocking a sideway or roadway. For another instance, in particular for pickups, the vehicle's computing devices may determine an expected wait-time of the queue and an expected arrival time for the passenger, and determine whether to enter the queue so as to avoid inconveniencing the other road users, such as avoiding the need to re-queue. As such, the sensor data may be used to track progresses of vehicles in the queue. The aforementioned model may be further trained to receive the sensor data as input, and output an expected wait-time.

Once it is determined that entering the queue would not inconvenience other road users, the vehicle's computing devices control the vehicle in order to join the queue. For example, the vehicle's computing devices may control the vehicle to drive towards the queue, stop behind the last vehicle in the queue, and/or move along with the queue.

In some instances, based on the sensor data, the vehicle's computing devices may also determine whether the queue has a designated spot for loading and unloading passengers. For example, the sensor data may indicate that vehicles in a queue momentarily stops at the front of the queue before speeding off, based on which the vehicle's computing devices may determine that the designated loading or unloading spot is the front of the queue. The vehicle's computing devices may control the vehicle to move along with the queue until the vehicle reaches the designated spot, and then control the vehicle to stop at the designated spot to perform pickup or drop-off. In this regard, the aforementioned model may be further trained to output a location of the designated spot. Further, the expected wait-time of the queue may be the time required for the vehicle to reach the designated spot in the queue.

If the passenger requesting pickup is at or near the designated spot when the vehicle arrives, the vehicle's computing devices may pick up the passenger at the designated spot. Alternatively, the vehicle's computing devices may allow the passenger to enter the vehicle before reaching the designated spot, for example based on determining whether loading or unloading outside the designated spot is tolerated.

If the passenger is not at or near the designated spot in the queue when the vehicle arrives, the vehicle's computing devices may determine an amount of time to wait for the passenger at the designated spot, and exit the queue after waiting the amount of time. The vehicle's computing devices may determine the amount of time to wait based on the map information, such as the type of the location. The vehicle's computing devices may also determine the amount of time to wait based on the sensor data, such as whether the vehicle would block traffic. In some examples, the vehicle's computing devices may determine an updated estimated arrival time for the passenger to reach the designated spot, and determine to exit the queue before waiting the amount of time. The vehicle's computing devices may control the vehicle to exit the queue and re-queue at a later time.

If the vehicle exits the queue before the passenger arrives, for example based on the updated estimated arrival time, the vehicle's computing devices may determine an expected wait-time to re-queue and reach the designated spot. Further, based on a comparison between the updated estimated arrival time and the expected wait-time to re-queue, the vehicle's computing devices may determine when to re-queue.

The vehicle's computing devices may be configured to communicate with the passenger. For example, to keep the passenger apprised of the vehicle's whereabouts while the vehicle waits in the queue, the vehicle's computing devices may be configured to send a message to a user device of the passenger indicating that the vehicle is waiting in the queue and the expected wait-time. For another example, the vehicle's computing devices may send a message to the passenger when the passenger should enter or exit the vehicle, such as when fully stopped a designated spot for loading or unloading. For yet another example, the vehicle's computing devices may send a message to the user device of the passenger indicating that the vehicle is returning to the end of the queue along with the expected wait-time to re-queue.

The features described above may enable autonomous vehicles to make independent determinations when queues exist for picking up and dropping off passengers at a location. This may reduce or even eliminate the need for remote operators to make these decisions while also reducing the time it takes for the vehicle to react to such situations. At the same time, by allowing the vehicle to automatically determine nuanced circumstances or rules of the queue, such as whether there is a designated spot for loading or unloading in the queue and whether the queue is fast-moving or slow-moving, the vehicle may be more responsive to its environment and less likely to block, inconvenience, and in some cases, annoy, the passenger or other road users.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. As an example, data 134 of memory 130 may store predefined scenarios. A given scenario may identify a set of scenario requirements including a type of object, a range of locations of the object relative to the vehicle, as well as other factors such as whether the autonomous vehicle is able to maneuver around the object, whether the object is using a turn signal, the condition of a traffic light relevant to the current location of the object, whether the object is approaching a stop sign, etc. The requirements may include discrete values, such as "right turn signal is on" or "in a right turn only lane", or ranges of values such as "having an heading that is oriented at an angle that is 30 to 60 degrees offset from a current path of vehicle 100." In some examples, the predetermined scenarios may include similar information for multiple objects.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing device having its own processor or central processing unit (CPU), memory, etc. which may interface with the computing device 110 via a high-bandwidth or other network connection. In some examples, this computing device may be a user interface computing device which can communicate with a user's client device. Similarly, the memory may be a hard drive or other storage media located in a housing different from that of computing device 110. Accordingly, references to a processor or computing device will be understood to include references to a collection of processors or computing devices or memories that may or may not operate in parallel.

Computing device 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing device 110 may be an autonomous driving computing system incorporated into vehicle 100. The autonomous driving computing system may capable of communicating with various components of the vehicle. For example, computing device 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in the vehicle's environment), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing device 110, in actuality, these systems may also be incorporated into computing device 110, again as an autonomous driving computing system for controlling vehicle 100.

The computing device 110 may control the direction and speed of the vehicle by controlling various components. By way of example, computing device 110 may navigate the vehicle to a drop-off location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing device 110 may interact with deceleration system 160 and acceleration system 162 in order to control the speed of the vehicle. Similarly, steering system 164 may be used by computing device 110 in order to control the direction of vehicle 100. For example, if vehicle 100 configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Navigation system 168 may be used by computing device 110 in order to determine and follow a route to a location. In this regard, the navigation system 168 and/or data 134 may store map information, e.g., highly detailed maps that computing devices 110 can use to navigate or control the vehicle. As an example, these maps may identify the shape and elevation of roadways, lane markers, intersections, crosswalks, speed limits, traffic signal lights, buildings, signs, real time or historical traffic information, vegetation, or other such objects and information. The lane markers may include features such as solid or broken double or single lane lines, solid or broken lane lines, reflectors, etc. A given lane may be associated with left and right lane lines or other lane markers that define the boundary of the lane. Thus, most lanes may be bounded by a left edge of one lane line and a right edge of another lane line. As noted above, the map information may store known traffic or congestion information and/or and transit schedules (train, bus, etc.) from a particular pickup location at similar times in the past. This information may even be updated in real time by information received by the computing devices 110.

Figure 2:
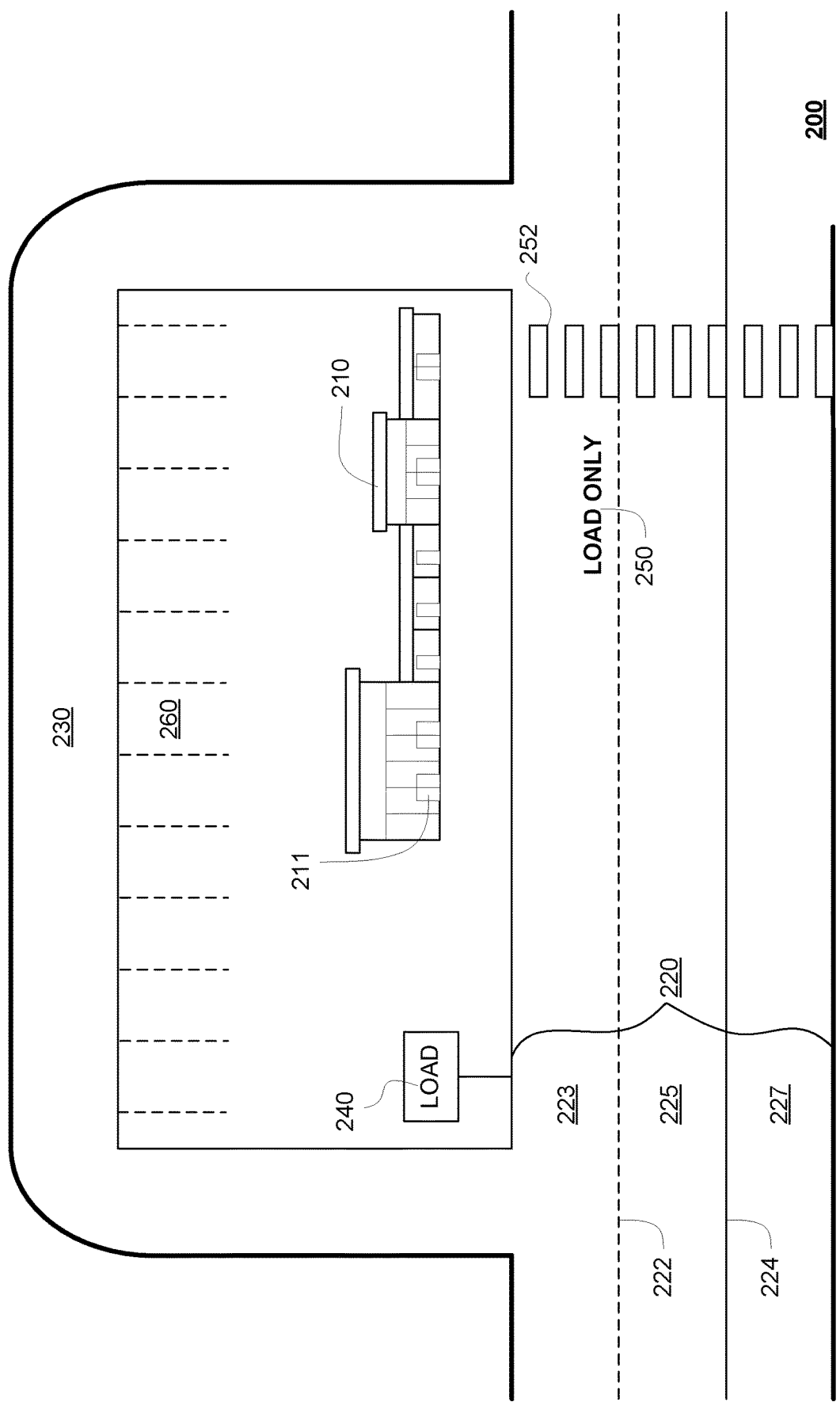
FIG. 2 is an example representation of map information in accordance with aspects of the disclosure.

FIG. 2 is an example of map information 200 for a location 210. For this example, map information 200 depicts a portion of the map information that includes information identifying a type of the location 210. For example, the type of the location 210 may be airport, train station, stadium, school, church, hospital, apartment building, house, etc. In this regard, the type of the location 210 may be collected from administrative records, such as county records, or manually labeled by a human operator after reviewing aerial images.

The map information 200 may include real-time information (not shown) about the location 210. For example, if the location 210 is an airport, the real-time information may include flight schedules. For another example, if the location 210 is a stadium, the real-time information may include event schedules. In this regard, the map information 200 may be flagged or otherwise linked with an online database, for instance at storage system 450 discussed further below, where such real-time information is available. As an alternative, once a vehicle's computing devices have identified a queue, the vehicle's computing devices may automatically request real time information from a remote server computing device and/or database. In addition or alternatively, a server computing device, such as server computing devices 410, may automatically send the real-time information based on information received from vehicle 100 about the vehicle's current location. In this regard, the vehicle may automatically receive the real-time information when the vehicle is within a certain area and/or a certain distance of a location likely to have a queue. In some instances, this information may be stored with the map information 200.

In addition, the map information 200 may include information about infrastructure available around the location 210. As shown, the map information 200 includes the shape, location, and other characteristics of road 220 and road 230 around the location 210. For example, the map information 200 may include an indication that road 220 has two way traffic, and road 230 has one way traffic. For another example, map information 200 may include lane markers or lane lines 222 and 224 for road 220. The lane lines may also define various lanes 223, 225, 227. As alternative to lane lines or markers, lanes may also be inferred by the width of a road. The map information 200 may also include information that identifies the direction of traffic and speed limits for each lane as well as information that allows the computing devices 110 to determine whether the vehicle has the right of way to complete a particular type of maneuver (i.e. complete a turn, cross a lane of traffic or intersection, etc.).

In addition to these features, the map information 200 may further include signs and markings on the roads at or near the location 210 with various characteristics and different semantic meanings. As shown, map information 200 includes sign 240 with the text "LOAD" which may indicate a location for loading passengers and/or cargo. Map information 200 also includes marking 250 in lane 223, with the text "LOAD ONLY" which may indicate a location for loading passengers and/or cargo with respect to text in the roadway. Map information 200 also includes marking for pedestrian crosswalk 252 in lanes 223, 225, and 227. The map information 200 may additionally include other features such as curbs, waterways, vegetation, etc.

The map information 200 may also store predetermined stopping areas including pickup and drop-off areas. Pickup areas may refer to areas where the autonomous vehicle stops to wait to pick up a passenger for a trip. Drop-off areas may refer to areas where the autonomous vehicle stops to allow for a passenger to exit the vehicle after a trip. In this regard, such areas may be hand-selected by a human operator or learned by a computing device over time. For example, the pickup and/or drop-off areas are typically at or near an entrance of a location. In this regard, map information 200 may additionally store locations of entrances and/or exits for the location 210, such as entrance 211. As shown, a portion of lane 223, being closest to entrance 211 of location 210 and/or associated with the aforementioned "LOAD ONLY" marking 250 in lane 223, may be labeled as a pickup and/or drop-off area for location 210.

Other stopping locations may include waiting areas, such as those where the vehicle can stop and wait for a passenger to arrive. For example, for a location that is a point of interest such as airport or school, there may be a waiting area for the location. As shown, parking lot 260, being behind the location 210, may be labeled as a waiting area. In this regard, such waiting areas may be selected through some manual or automated analysis of the characteristics of each location.

The map information may further include GPS coordinates (not shown) of the location 210, and various other infrastructure at the location 210 as described above, such as roads 220 and 230, lanes 223, 225, 227, and parking lot 260.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

Figure 3:
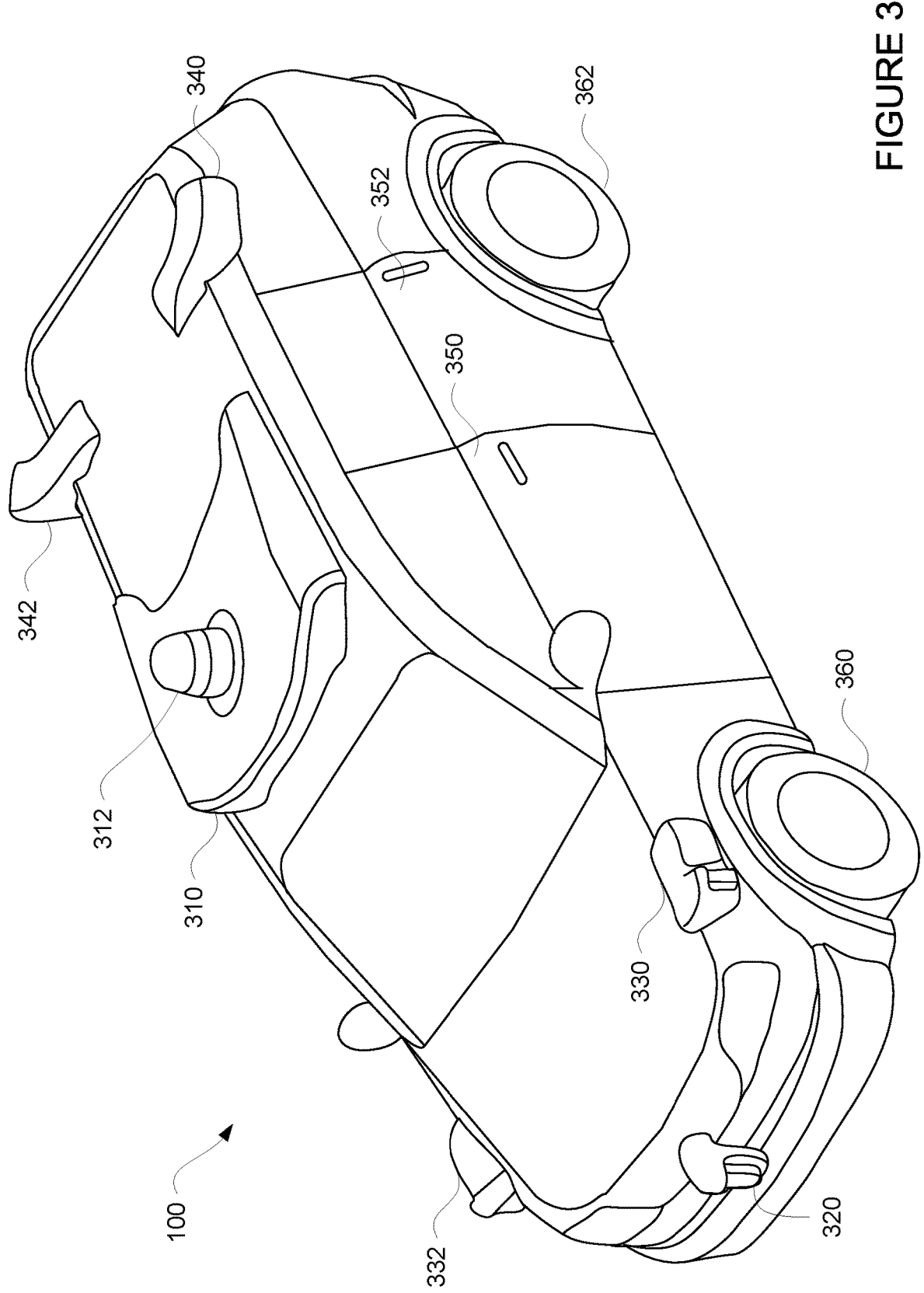
FIG. 3 is an example external view of a vehicle in accordance with aspects of the disclosure.

For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

Once a nearby object is detected, computing devices 110 and/or perception system 172 may determine the object's type, for example, a traffic cone, pedestrian, a vehicle (such as a passenger car, truck, bus, etc.), bicycle, etc. Objects may be identified by various models which may consider various characteristics of the detected objects, such as the size of an object, the speed of the object (bicycles do not tend to go faster than 40 miles per hour or slower than 0.1 miles per hour), the heat coming from the bicycle (bicycles tend to have rider that emit heat from their bodies), etc. In addition, the object may be classified based on specific attributes of the object, such as information contained on a license plate, bumper sticker, or logos that appear on the vehicle.

In one example, computing devices 110 may be operable to identify queuing behaviors of other vehicles from sensor data provided by the perception system 172, for example, by looking for and identifying a line of vehicles stopped in a lane near an entrance or exit of a point of interest. However, memory 130 may also store behavior models trained to recognize queuing behaviors. The behavior models may include machine learning models, such as a deep neural network. A model may be trained by using sensor data generated by perception system 172 with labeled instances of when a queue is identified. These labels may be generated, for instance, based on the aforementioned determinations made by remote operators. The sensor data may include all of the data generated by the perception system 172, or more streamlined information, such as the pose, velocity, acceleration and similar data for each road user detected by the perception system over some period of time.

As described in detail below with respect to example situations, such labeled instances of queues may include images of a line of vehicles formed in a lane next to a point of interest, or next to certain signs or markings. To further discriminate between traffic patterns, the behavior models may be trained with time-sequenced series of data. Such time correlation may allow the behavior models to recognize changes in traffic patterns over time, and based on such changes, distinguish queuing behaviors from other behaviors that may resemble queuing behavior in a snapshot (such as a traffic jam).

Optionally, the behavior models may be trained to use sensor data from perception system 172 as input, and output additional information about an identified queue. For example, as described in detail below with respect to example situations, the behavior models may be trained to recognize a designated spot in the queue for loading and/or unloading passengers. For another example, also described in detail below with respect to example situations, the behavior models may be trained to predict an expected wait-time to reach the designated spot in the queue.

Figure 4:
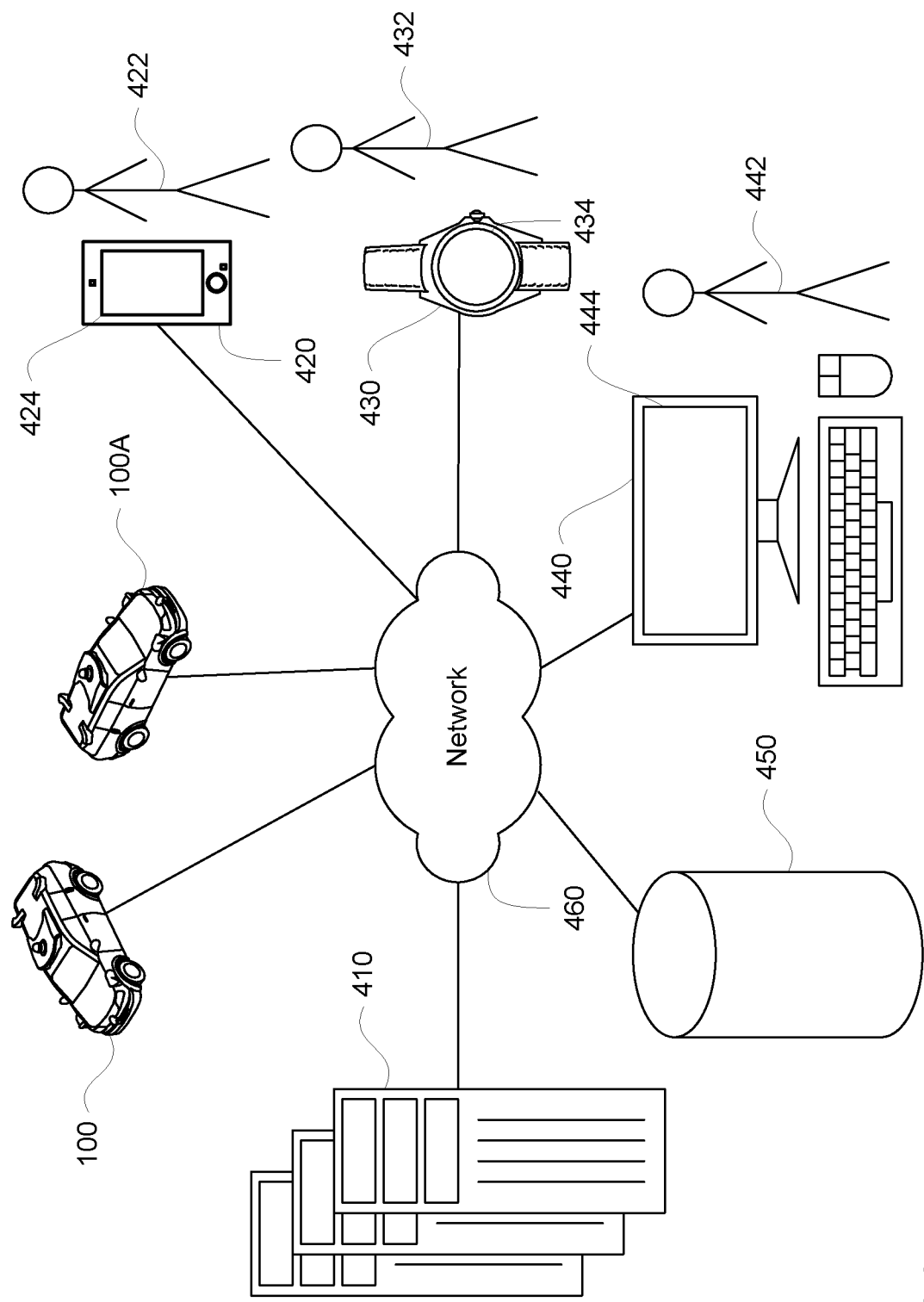
FIG. 4 is an example pictorial diagram of a system in accordance with aspects of the disclosure.
Figure 5:
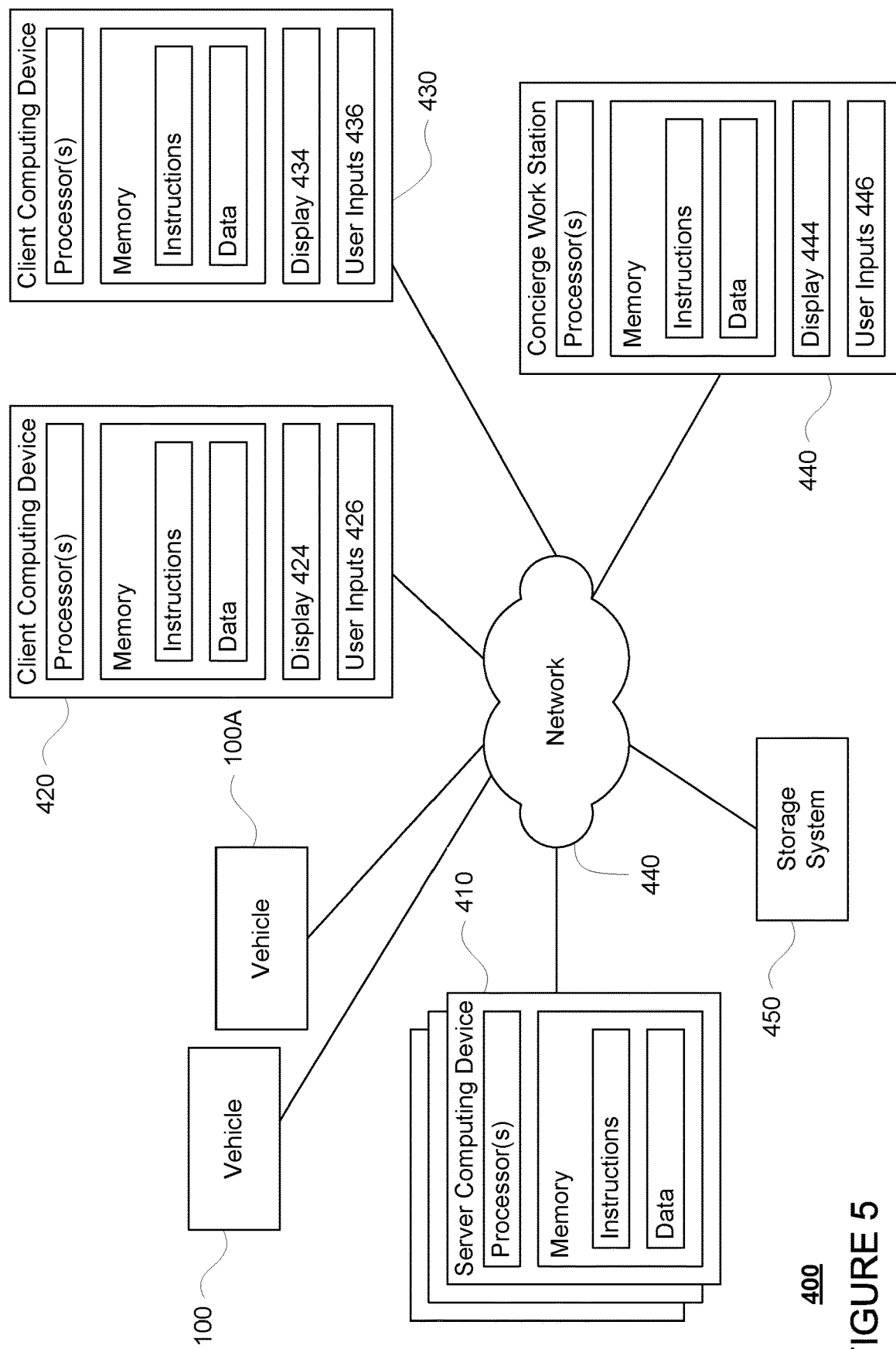
FIG. 5 is an example functional diagram of a system in accordance with aspects of the disclosure.

The one or more computing devices 110 of vehicle 100 may also receive or transfer information to and from other computing devices, for instance using wireless network connections 156. The wireless network connections may include, for instance, BLUETOOTH®, Bluetooth LE, LTE, cellular, near field communications, etc. and various combinations of the foregoing. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicle 100A which may be configured similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as BLUETOOTH®, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include a server having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with one or more computing devices 110 of vehicle 100 or a similar computing device of vehicle 100A as well as client computing devices 420, 430, 440 via the network 460. For example, vehicles 100 and 100A may be a part of a fleet of vehicles that can be dispatched by server computing devices to various locations. In this regard, the vehicles of the fleet may periodically send the server computing devices location information provided by the vehicle's respective positioning systems and the one or more server computing devices may track the locations of the vehicles.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). A user, such as user 422, 432, 442, may send information, such as pickup or drop-off requests, to server computing devices 410, using user input devices 426, 436, 446 of computing devices 420, 430, 440. The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wrist watch in FIG. 4. As an example the user may input information using a small keyboard, a keypad, microphone, using visual signals with a camera, or a touch screen.

In some examples, client computing device 440 may be remote operator work station used by an administrator to provide remote operator services to users such as users 422 and 432. For example, a remote operator 442 may use the remote operator work station 440 to communicate via a telephone call or audio connection with users through their respective client computing devices and/or vehicles 100 or 100A in order to ensure the safe operation of vehicles 100 and 100A and the safety of the users as described in further detail below. Although only a single remote operator work station 440 is shown in FIGS. 4 and 5, any number of such work stations may be included in a typical system.

Storage system 450 may store various types of information as described in more detail below. This information may be retrieved or otherwise accessed by a server computing device, such as one or more server computing devices 410, in order to perform some or all of the features described herein. For example, the information may include user account information such as credentials (e.g., a username and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), as well as age information, health information, and user history information about how long it has taken the user to enter or exit vehicles in the past as discussed below.

The storage system 450 may also store routing data for generating and evaluating routes between locations. For example, the routing information may be used to estimate how long it would take a vehicle at a first location to reach a second location. In this regard, the routing information may include map information, not necessarily as particular as the detailed map information described above, but including roads, as well as information about those road such as direction (one way, two way, etc.), orientation (North, South, etc.), speed limits, as well as traffic information identifying expected traffic conditions, etc.

The storage system 450 may also store information which can be provided to client computing devices for display to a user. For instance, the storage system 450 may store predetermined distance information for determining an area at which a vehicle is likely to stop for a given pickup or drop-off location. The storage system 450 may also store graphics, icons, and other items which may be displayed to a user as discussed below.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the systems described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 410, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. As part of this, the user may identify a pickup location, a drop-off location, and, in some cases, one or more intermediate stopping locations anywhere within a service area where a vehicle can stop.

These pickup and drop-off locations may be predefined (e.g., specific addresses of residences or points of interest.) or may simply be any location within a service area of the vehicles (e.g., defined by GPS coordinates). As an example, a pickup location can be defaulted to the current location of the user's client computing device, or can be input by the user at the user's client computing device. For instance, the user may enter an address or other location information or select a location on a map to select a pickup location. Once the user has selected one or more of a pickup and/or drop-off locations, such as location 210, the client computing device 420 may send the location or locations to one or more server computing devices of the centralized dispatching system.

In response, one or more server computing devices, such as server computing device 410, may select a vehicle, such as vehicle 100, for instance based on availability and proximity to the user. The server computing device 410 may then assign the user as the passenger for the vehicle 100, dispatch the selected vehicle (here vehicle 100) to pick up the assigned passenger. This may include by providing computing devices 110 with the pickup and/or drop-off locations specified by the assigned passenger as well as information that can be used by the computing devices 110 of vehicle 100 to authenticate the client computing device, such as client computing device 430.

Figure 6:
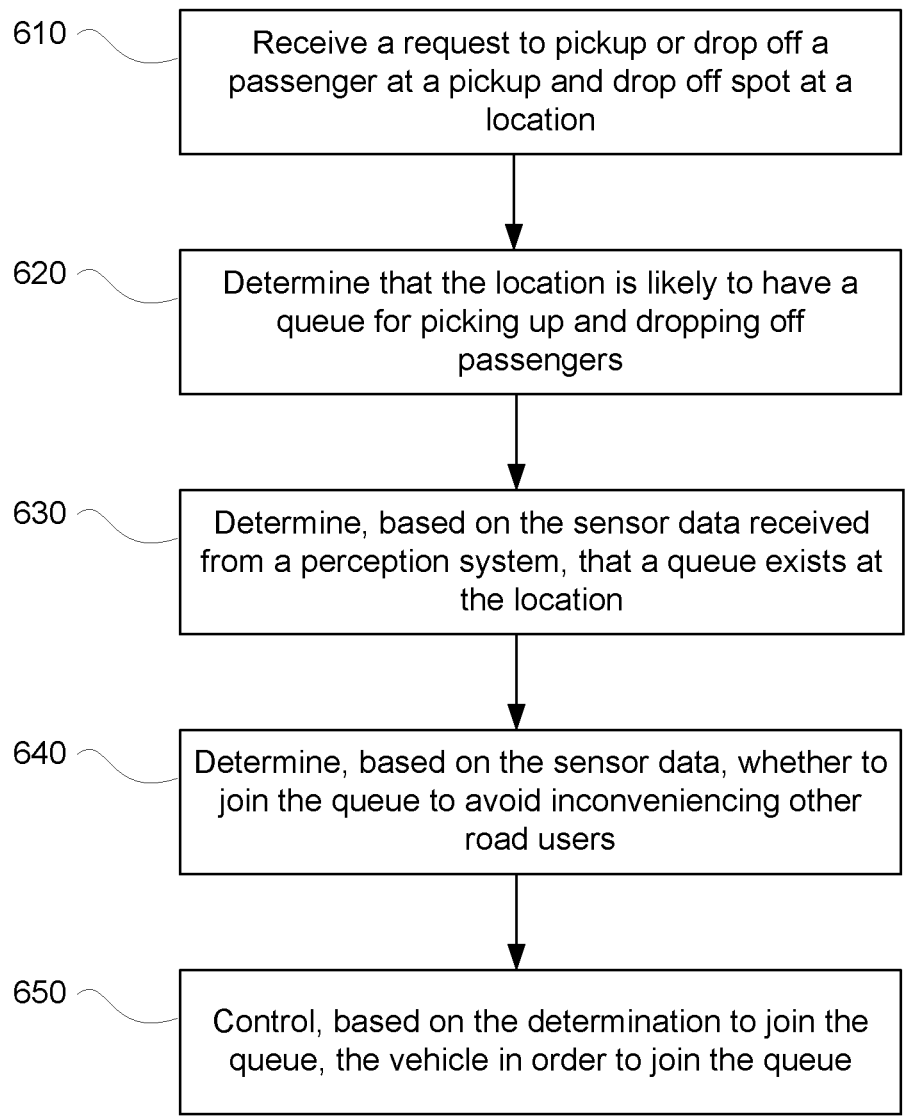
FIG. 6 is an example flow diagram in accordance with aspects of the disclosure.

FIG. 6 is an example flow diagram 600 that may be performed by one or more processors, such as one or more processors 120 of computing devices 110. For example, processors 120 of computing devices 110 may receive data and make various determinations as shown in flow diagram 600, and control the vehicle 100 based on these determinations. Referring to FIG. 6, in block 610, a request to pick up or drop off a passenger at a pickup and drop off spot at a location is received. In this regard, the computing device 110 may receive a request to pick up or drop of the passenger from the server computing device 410 as discussed above.

Thereafter, the computing devices 110 may maneuver vehicle 100 towards the pickup location and, after picking up the passenger, towards the drop-off location. While doing so, the computing devices 110 may receive sensor data from the perception system 172 in order to detect, identify and respond to objects including road users (vehicles, bicycles, and passengers), barriers, and signs.

In some instances, though not shown, computing devices 110 may determine based on the map information 200, that the location 210 has a plurality of designated pickup or drop-off areas, and control the vehicle 100 to maneuver to one of the designated pickup or drop-off areas. For example, an airport may have multiple terminals and multiple doors at each terminal for pickup and/or drop-off. In such instances, computing devices 110 may select one of the designated pickup and/or drop-off areas. For example, computing devices 110 may send a message to the user device of the passenger asking the passenger for a preferred spot for pickup or drop-off at the location. Upon receiving user feedback, such as a message from the passenger indicating the preferred spot for pickup or drop-off, computing devices 110 may determine, based on the map information 200, which of the designated pickup or drop-off areas is closest to the preferred spot for pickup or drop-off. Computing devices 110 may then control the vehicle 100 to drive to the designated pickup or drop-off area closest to the preferred spot for pickup or drop-off.

Referring back to FIG. 6, in block 620, it is determined whether the pickup or drop-off location is likely to have a queue for passenger pickup or drop-off. For instance, computing devices 110 may determine whether the location is likely to have a queue based on a type of the location. For example, if location 210 is selected as a pickup or drop-off location, computing devices 110 may determine, based on map information 200 indicating that the location 210 is an airport, that the location 210 is likely to have a queue for passenger pickup or drop-off. For another example, computing devices 110 may determine, based on map information indicating that the location 210 is a house, that the location 210 is not likely to have a queue for passenger pickup or drop-off.

For another instance, computing devices 110 may determine whether the location is likely to have a queue further based on real-time information, such as event schedules obtained from an online database. For example, computing devices 110 may determine, based on map information 200 indicating that the location 210 is a stadium with a scheduled sporting event at or around the time of the pickup or drop-off, that the location 210 is likely to have a queue for passenger pickup or drop-off. For another example, computing devices 110 may determine, based on map information 200 indicating that the location 210 is a church with no scheduled service at or around the time of the pickup or drop-off, that the location 210 is not likely to have a queue for passenger pickup and/or drop-off.

Referring back to FIG. 6, when it is determined that the location is likely to have a queue for passenger pickup or drop-off, in block 630, it is determined using sensor data from a perception system whether there is a queue at a chosen pickup or drop-off spot at the location. For example, as vehicle 100 approaches the location 210, computing devices 110 may use sensor data from the perception system 172 to determine whether there is actually a queue for pickups or drop-offs at the location 210. For example, computing devices 110 may receive sensor data from perception system 172 at the location 210, input these sensor data into the behavior models described above, and receives output from the behavior models indicating whether a queue exists at the location 210. As illustrated by the example situations below, the determination may be based on identifying traffic patterns, changes in these traffic patterns over time, signs, and/or markings. In this regard, there may be more than one pick-up and drop off spot for a given location, and these pick-up or drop-off spots may be predetermined (such as the pick-up and/or drop off areas described above), indicated by signage, and/or formed spontaneously, such as when other vehicles begin displaying queueing behaviors for a pick-up or drop-off spot not previously designated as such in the map information or otherwise.

Figure 7B:
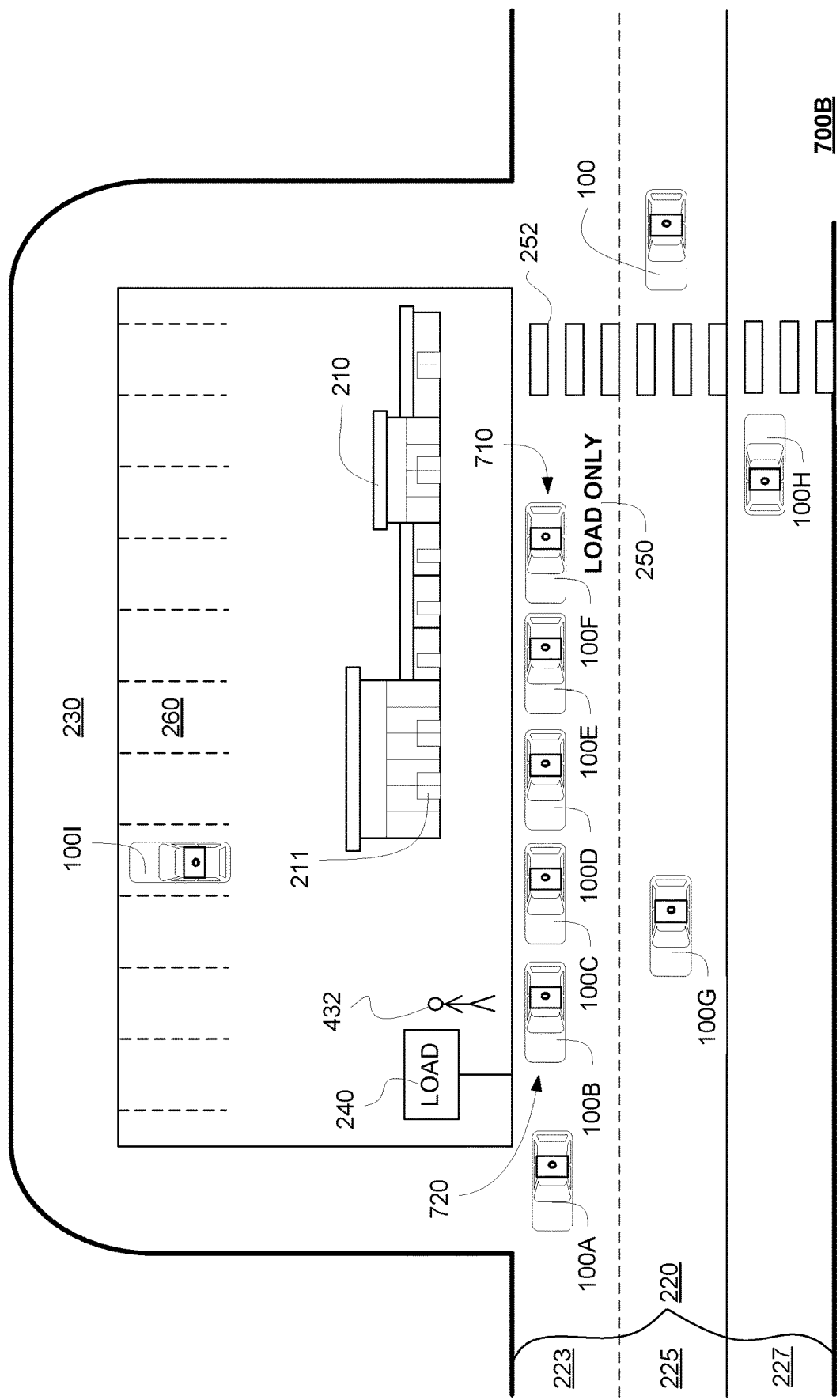

FIGS. 7A and 7B illustrate example situations 700A and 700B for determining whether a queue exists at a location that is likely to have a queue for passenger pickup or drop-off. Various features in FIGS. 7A and 7B may generally correspond to the shape, location, and other characteristics of features shown in map information 200 of FIG. 2, and labeled as such. Additional features in FIGS. 7A and 7B, including various road users and other objects, are described in detail below. Although these examples are useful for demonstration purposes, they should not be considered limiting.

Referring to FIG. 7A, situation 700A shows the environment surrounding location 210 as vehicle 100 approaches location 210 in lane 225. In addition to the features already described with respect to FIG. 2, Situation 700A shows various road users, including vehicles 100, 100F, and 100G in lane 225, vehicles 100A-E in lane 223, vehicle 100H in lane 227, and vehicle 100I parked in parking lot 260; as well as various pedestrians, such as users 422 and 432.

Computing devices 110 receive sensor data from perception system 172, which detects vehicles 100A, 100B, 100C, 100D, and 100E in lane 223. Based on this sensor data, computing devices 110 may identify a traffic pattern, for instance, that vehicles 100A-E form a line or a queue 710, and conclude that a pickup or drop-off queue exists at location 210. For another example, computing devices 110 may further determine that lane 223 is the closest lane to entrance 211 of the location 210, and conclude that the queue 710 formed in lane 223 is a pickup or drop-off queue. For still another example, computing devices 110 may further determine that queue 710 exists even though there is nothing blocking vehicle 100A in lane 223, the first vehicle in queue 710, and conclude that queue 710 is a pickup or drop-off queue.

Alternatively or additionally, changes in traffic pattern may be used to determine whether a queue exists. Referring to FIG. 7B, example situation 700B again shows the environment surrounding location 210, but after some time has lapsed since situation 700A was captured by the perception system 172. For instance, 700B may be captured a fraction of a second or a few seconds after situation 700A. As shown, each of vehicles 100, 100A-H have changed their positions in 700B compared to 700A. Further, during the lapsed time, computing devices 110 may continue to receive sensor data from perception system 172, which may capture intermediate movements of vehicles 100A-H between the situations 700A and 700B.

Based on the sensor data captured during the lapsed time, computing devices 110 may determine changes in the traffic pattern, including changes to queue 710. For instance, computing devices 110 may determine that, during the lapsed time, vehicles 100A-100E moved very slowly during this time, despite there being nothing (i.e. no objects such as cones, pedestrians, other vehicles, etc.) blocking vehicle 100A. For another instance, computing devices 110 may determine that, after coming to a complete stop at the front 720 of queue 710, and a brief pause, vehicle 100A leaves queue 710 and drives away. For still another instance, computing devices 110 may determine that, after vehicle 100A left the queue 710, vehicle 100B drives up and stops where vehicle 100A had previously stopped, and vehicles 100C-E follows vehicle 100B in queue 710. For yet another example, computing devices 110 may determine that, once vehicles 100C-E moves up in queue 710, vehicle 100F in lane 225 switches to lane 223 and stops behind vehicle 100E, the last vehicle in queue 710, instead of continuing to drive in lane 225, which has fewer vehicles (and thus likely move quicker). Thus, based on identifying such changes in traffic patterns, computing devices 110 may distinguish a line of vehicles formed as a pickup or drop-off queue from a line of vehicles formed as a result of a traffic jam, or other traffic situations.

Additionally or alternatively, computing devices 110 may determine whether a queue exists based on signs and/or markings detected from sensor data, and in some instances, whether those signs are within a predetermined distance of a traffic pattern, such as 15 feet or more or less. For example, as shown in FIG. 7A, computing devices 110 may determine, based on sensor data indicating that a sign 240 with text "LOAD" is located on the sidewalk next to lane 223 and that queue 710 formed by vehicles 100A-E in the lane 223 is a queue for pickup or drop-off. For another example, computing devices 110 may determine, based on sensor data indicating that markings 250 with text "LOAD ONLY" is located in lane 223 and that queue 710 formed by vehicles 100A-E in the lane 223 is a queue for pickup or drop-off. In other examples, other texts or markings (such as a sign with a person carrying luggage, colors, text and/or shapes in lanes, etch.) may be determined by computing devices 110 as indicating a queue for pickup or drop-off. Thus, based on detecting signs and/or markings, computing devices 110 may distinguish a line of vehicles formed as a pickup or drop-off queue from a line of vehicles formed as a result of a traffic jam, or other traffic situations.

Once a pickup or drop-off queue is identified, referring back to FIG. 6, in block 640, it is determined based on the sensor data whether to join the queue to avoid inconveniencing other road users. Inconveniencing other users may include, for example, blocking vehicle or pedestrian traffic, interfering with loading or unloading of other vehicles, slowing down the queue (such as by re-queueing).

For example, FIG. 8 shows an example situation 800 where computing devices 110 determine whether to join the queue. FIG. 8 shows many of the same features of FIG. 7B, but with differences as discussed further below. As shown, vehicle 100G is the last vehicle in queue 710 and is positioned such that it is partially blocking crosswalk 252. If vehicle 100 enters queue 710 behind vehicle 100G, vehicle 100 would block the entire crosswalk 252, thereby inconveniencing pedestrians who want to cross the crosswalk 252, such as pedestrian 820. Further, if vehicle 100 enters queue 710 behind vehicle 100G, vehicle 100 would also partially block road 230, thereby inconveniencing vehicles that are exiting that road, such as vehicle 100H. For another example, as shown, vehicle 100G is in the process of loading or unloading pedestrian 810, if vehicle 100 enters queue 710 behind vehicle 100G, pedestrian 810 may be inconvenienced when attempting to open a trunk of vehicle 100G. These examples are shown as inconvenience factors 832 and 834, based on which a decision 836 is made not to enter the queue 710.

If computing devices 110 determine not to enter the queue 710 to avoid inconveniencing these other road users, computing devices 110 may control the vehicle 100 in order to wait before entering the queue 710. For example, computing devices 110 may control vehicle 100 to wait in lane 223. While waiting, computing devices 110 may continue to use sensor data in order to determine whether and when to join the queue 710. For example, computing devices 110 may determine based on sensor data that vehicle 100G moved forward in queue 710, or finished loading or unloading, and then determine that vehicle 100 can join queue 710 without inconveniencing other road users.

FIG. 9 shows another example situation 900, in particular for pickups, where computing devices 110 determine whether to join the queue. FIG. 9 shows many of the same features of FIG. 7B, but with differences as discussed further below. In situation 900, computing devices 110 determine an expected wait-time of the queue 710, based on which computing devices 110 may determine whether to enter the queue 710.

As such, computing devices 110 may determine that the queue 710 has a designated spot 910 for loading and unloading passengers. For example, if the sensor data indicate that vehicles 100A-F in the queue 710 momentarily stops at the front of the queue 710 before speeding off, computing devices 110 may determine based on this sensor data that the designated loading or unloading spot 910 is at the front of the queue 710. For another example, computing devices 110 may determine based on the sensor data including signs and markings such as the sign 240 with text "LOAD," that the designated spot 910 is where the sign 240 is located. For yet another example, the sensor data may indicate barriers 920 are positioned along the lane 223 where queue 710 is formed, the computing devices 110 may determine where the barrier 920 opens is the designated spot 910 for loading or unloading passengers.

Computing devices 110 may then predict, based on the sensor data, an expected wait-time for the vehicle 100 to reach the designated spot 910 in the queue 710. In some examples, computing devices 110 may track the progress of vehicles in the queue using the sensor data. For instance, based on the sensor data, computing devices 110 may determine a total number of vehicles in the queue 710, calculate an average pause time at the designated spot 910 for the vehicles in the queue 710, and then multiply the average pause time by the total number of vehicles in the queue 710. For example, as shown, computing devices 110 may determine that the queue 710 has a total of 5 vehicles. As shown, computing devices 110 may also determine that vehicle 100A had a pause time 930 of 15 seconds, and vehicle 100B had a pause time 940 of 25 seconds, and estimate that the average pause time for vehicles in queue 710 is approximately 20 seconds. Computing devices 110 may then multiply 20 seconds by 5 vehicles in the queue 710, and estimate that, once entered into queue 710, vehicle 100 would have an expected wait-time 952 of approximately 100 seconds, or about one and a half minutes.

In other examples, computing devices 110 may use predetermined pause times for different types of locations. For instance, the computing devices 110 may use a predetermined pause time of 30 seconds for loading or unloading passengers with luggage when the map information 200 indicate that the location 210 is an airport, and then multiply the predetermined pause time by the total number of vehicles in the queue 710 to determine the predicted wait-time. In this regard, the predetermined pause times for different types of locations may be set based on historical or statistical data, for example such data and predetermined pause times may be stored on server computing devices 410 and accessible by the computing devices 110.

Computing devices 110 may also predict an estimated arrival time for the passenger to reach the designated spot 910. This estimated arrival time may be based on any number of different factors, including for instance, general information about the pickup location, this specific passenger or similarly situated passengers, event specific information, etc. For instance, given the current location, for example GPS location, of a passenger's client computing devices, the arrival time may be estimated in part based on the distance from the current location to the vehicle and an estimated walking speed for a person or a model of how long it would take a passenger to walk the distance. In addition or alternatively, the estimated arrival time may be based on the passenger's specific history with arrival times, the history of all passengers at the location, the history of passengers with similar characteristics at this or any location, etc. In this regard, estimated arrival times may be estimated by clustering or pooling data. For example, passengers who are typically late, are more likely to be late. As another instance, the server computing devices 410 may monitor event information such as flight, train and/or event status, and such information could be used to estimate an arrival time. In addition, regarding the airport example, whether the passenger is likely to have to pick up checked baggage (it may be more likely if the passenger is or was on an international flight) as well as how long it typically takes this or other similarly situated passengers to reach the queue. As another instance, the estimated arrival time may be determined based on the type of event that has occurred or is occurring at of the type of location of the pickup location. For example, during sporting events at stadiums, passengers may take additional time to exit a stadium. As another example, at a grocery store, passengers may tend to have more variance, whereas for picking up passengers after school may be more consistent. By comparing the expected wait-time of the queue with the estimated arrival time for the passenger requesting pickup, computing devices 110 may determine whether the vehicle 100 should enter the queue 710, wait a while somewhere else before queuing, or go to an alternative pickup spot.

In instances where the estimated arrival time of the passenger is greater than the expected wait-time, computing devices 110 may determine not to enter the queue 710 to reduce wait-times of other vehicles in the queue 710 and to avoid the need for re-queueing. In some examples, if the estimated arrival time is greater than the expected wait-time by a first predetermined threshold difference, computing devices 110 may control the vehicle 100 to park in a waiting area. The first predetermined threshold difference may be selected as any appropriate duration, for example such as 30 seconds, 1 minute, 5 minutes, etc. For example, as shown, computing devices 110 may determine that, user 432, who requested the pickup, has an estimated arrival time 954 of 10 minutes to reach the designated spot 910 (for example based on GPS coordinates of client computing device 430 or a message from user 432), and determine that the 10 minutes estimated arrival time 954 is greater than the expected wait-time 952 of 100 seconds by more than the first threshold difference of 1 minute.

In this regard, computing devices 110 may determine, based on the map information 200 about the location 210, where the appropriate waiting area is at this location 210. For example, as shown, computing devices 110 may determine based on map information 200, that parking lot 260 is the appropriate waiting area 956 for the location 210. Continuing from the example above, computing devices 110 may therefore make a decision 958 not to enter the queue 710 and to wait in parking lot 260 before queuing.

In instances where the estimated arrival time of the passenger is less or equal to the expected wait-time in the queue, or not greater than the expected wait-time by the first predetermined threshold difference, the computing devices 110 may determine to enter the queue immediately. This way, the vehicle 100 does not incur extra wait-time for the passenger. For example, computing devices 110 may determine that, user 432, who requested the pickup, is 2 minutes away from the designated spot 910 (for example based on GPS coordinates of client computing device 430 or a message from user 432), and determine that 2 minutes is not greater than the expected wait-time of 100 seconds by more than the first threshold difference of 1 minute. Computing devices 110 may thus determine to enter the queue 710.

Referring back to FIG. 6, in block 650, the vehicle is controlled to join the queue based on the determination to join the queue. Referring to FIG. 9, for example, computing devices 110 may control the vehicle 100 to drive towards the queue 710, such as switching from lane 225 into lane 223. Computing devices 110 may determine based on sensor data where the queue 710 ends, and control the vehicle 100 to stop behind the last vehicle in the queue 710, which is vehicle 100F.

Once vehicle 100 enters the queue 710, computing devices 110 may control the vehicle 100 to move along with vehicles in queue 710, for example by following the vehicle 100F in front of it. Computing devices 110 may control the vehicle 100 to move along in queue 710 until the vehicle reaches the designated spot 910, and then control the vehicle 100 to stop at the designated spot 910 to perform pickup or drop-off. In some examples, though not shown, where the queue includes multiple lanes, computing devices 110 may control the vehicle 100 to shift to the lane closest to the pickup or drop-off location before reaching the designated spot 910.

For drop-offs and for pickups where the passenger requesting pickup is at or near the designated spot 910 when the vehicle 100 arrives, computing devices 110 may control vehicle 100 to perform the pickup or drop-off at the designated spot 910. Alternatively, computing devices 110 may allow the passenger to enter or exit the vehicle 100 before reaching the designated spot 910. In this regard, computing devices 110 may track loading and unloading events of nearby vehicles, including vehicles in queue 710, and decide whether loading or unloading outside the designated spot 910 is tolerated. For instance, referring back to FIG. 8, based on sensor data indicating that vehicle 100G is loading and/or unloading pedestrian 810, computing devices 110 may determine that picking up or dropping off passengers is tolerated at locations other than the front of queue 710.

To keep the passenger apprised of the vehicle's whereabouts while the vehicle 100 waits in queue 710, the computing devices 110 may be configured to send a message to a client computing device of the passenger, such as client computing device 420 of user 422, or client computing device 430 of user 432, indicating that the vehicle is waiting in the queue 710. For example, the message may include the expected wait-time for the queue 710. For another example, the message may include a request for an updated arrival time of the passenger requesting pickup, or a request for the passenger's current location. For still another example, computing devices 110 may send a message to the passenger's client computing device indicating when the passenger should enter or exit the vehicle 100, such as when vehicle 100 has fully stopped at the designated spot 910. Similarly, computing devices 110 may display a message, for instance on the internal electronic display 152, requesting that the passenger wait to exit the vehicle until the vehicle has reached the designated spot. This may prevent a passenger from entering and/or exiting the vehicle too early, for instance, before the vehicle has reached the designated spot.

In some instances, once the vehicle has entered the queue, computing devices of the vehicle may determine an amount of time to wait for a passenger requesting pickup at the designated spot for loading or unloading. For example, FIG. 10 shows an example situation 1000 in particular for pickups, where computing devices 110 determine an amount of time to wait for the passenger who requested the pickup at the designated spot 910. FIG. 10 shows many of the same features of FIG. 9, but with differences as discussed further below. As shown, user 432, who requested the pickup, is not at or near the designated spot 910 in the queue 710 when vehicle 100 arrives at the designated spot 910, computing devices 110 may then determine an amount of time to wait for user 432 at the designated spot 910, and exit the queue 710 after waiting that amount of time.

For instance, computing devices 110 may determine the amount of time to wait based on the map information 200. For example, as shown, if the map information 200 indicate that the location 210 is an airport, computing devices 110 may determine the appropriate amount of time 1010 to wait at the designated spot 910 before exiting the queue 710 is up to 1 minute. For another example, if the map information 200 indicate that the location is a school, computing devices 110 may determine the appropriate amount of time to wait at the designated spot 910 is up to 5 minutes before exiting the queue 710.

For still another instance, computing devices 110 may determine the amount of time to wait further based on a level of difficulty to exit the queue and re-queue. For example, as shown, if the map information 200 indicate that there is a relatively simple way to exit and re-enter the queue 710, such as the easy exit 1020 provided by road 230, computing devices 110 may determine to wait a predetermined amount of time at the designated spot 910, such as 5 seconds or more or less, before exiting the queue 710.

Computing devices 110 may further determine the amount of time based on the sensor data. For instance, the sensor data may indicate whether the designated spot 910 blocks traffic 1030. If the sensor data indicate that stopping at the designated spot would block ongoing traffic or otherwise inconvenience other users, such as those illustrated by situation 800 of FIG. 8, computing devices 110 may reduce the amount of time determined based on the map information 200. For example, if computing devices 110 determine to wait 1 minute at the designated spot 910 based on map information 200 indicating that location 210 is an airport, computing devices 110 may reduce the amount of time from 1 minute to a predetermined amount of time at the designated spot 910, such as 5 seconds or more or less, when determined that stopping at the designated spot 910 would inconvenience other road users, such as blocking ongoing traffic or pedestrian crossings.

In some examples, computing devices 110 may determine an updated estimated arrival time for the passenger to reach the designated spot 910, and determine to exit the queue 710 before waiting the amount of time. In this regard, computing devices 110 may send a message to the passenger if he or she is not there when the vehicle 100 arrived at the designated spot 910, and may receive an updated estimated arrival time from the passenger. Alternatively, computing devices 110 may determine the updated estimated arrival time based on an updated geographical location of the passenger. Continuing from the airport example above, as shown, if the updated estimated arrival time 1050 is 5 minutes when the vehicle 100 reached the designated spot 910 in the queue 710, computing devices 110 may determine not to wait at all, since waiting the 1 minute would achieve nothing other than slowing down the queue 710. Computing devices 110 thus may simply make a decision 1040 that the vehicle 100 should exit the queue 710 and re-queue at a later time.

If the vehicle 100 exits the queue before the passenger arrives, for example based on the updated estimated arrival time, computing devices 110 may determine an expected wait-time to re-queue and reach the designated spot 910. Further, based on a comparison between the updated estimated arrival time and the expected wait-time to re-queue, computing devices 110 may determine whether to re-queue immediately. In this regard, the process may be analogous to comparing the estimated arrival time and the expected wait-time of the queue as illustrated in FIG. 9. For instance, if the updated estimated arrival time is less or equal to the expected wait-time to re-queue, computing devices 110 may determine to re-queue immediately. Computing devices 110 may also send a message to the user device of the passenger indicating that the vehicle is returning to the end of the queue 710 along with the expected wait-time to re-queue. Alternatively, if the updated estimated arrival time is greater than the expected wait-time to re-queue, computing devices 110 may control the vehicle 100 to park in a waiting area, such as parking lot 260.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of joining a vehicle queue by an autonomous vehicle, the method comprising:
   receiving, by one or more processors of the autonomous vehicle, information including a request for the autonomous vehicle to pick up or drop off a passenger at a location;
   determining, by the one or more processors based on a schedule associated with the location, that the location is currently likely to have a vehicle queue to pick up or drop off passengers;
   receiving, by the one or more processors, sensor data from a perception system of the autonomous vehicle as the autonomous vehicle approaches the location;
   determining, by the one or more processors based on the sensor data, whether a traffic pattern indicating that the vehicle queue actually exists at the location, the vehicle queue including a plurality of vehicles waiting in a line for at least one of picking up or dropping off passengers;
   when the vehicle queue actually exists, determining, by the one or more processors based on the sensor data, a time when the autonomous vehicle should join the vehicle queue to wait in the line to pick up or drop off one or more passengers at the location; and
   controlling, by the one or more processors, the autonomous vehicle to join the vehicle queue at the determined time by joining the line and stopping behind a last one of the plurality of vehicles to wait in the line to pick up or drop off the one or more passengers at the location.

2. The method of claim 1, wherein the traffic pattern is identified by the one or more processors based on at least one of one or more signs observed from the sensor data.

3. The method of claim 2, wherein the signs are within a predetermined distance of the vehicle queue.

4. The method of claim 1, wherein the traffic pattern is identified by the one or more processors based on changes in traffic patterns observed using a time series of the sensor data.

5. The method of claim 1, further comprising:
   determining, by the one or more processors based on the sensor data, whether the autonomous vehicle would block traffic when the autonomous vehicle joins the vehicle queue,
   wherein the time when the autonomous vehicle should join the vehicle queue is determined based on whether the autonomous vehicle would block traffic when the autonomous vehicle joins the vehicle queue.

6. The method of claim 1, further comprising:
determining, by the one or more processors based on the sensor data, whether the autonomous vehicle would interfere with loading or unloading by another vehicle when the autonomous vehicle joins the vehicle queue,
wherein the time when the autonomous vehicle should join the vehicle queue is determined based on whether the autonomous vehicle would interfere with the loading or unloading by another vehicle when the autonomous vehicle joins the vehicle queue.

7. The method of claim 1, further comprising:
determining, by the one or more processors based on the sensor data, a designated spot in the vehicle queue for loading and unloading passengers, and
controlling, by the one or more processors, the autonomous vehicle to move along in the vehicle queue to reach the designated spot.

8. The method of claim 7, further comprising:
predicting, by the one or more processors based on the sensor data, an expected wait-time for the autonomous vehicle to reach the designated spot in the vehicle queue; and
sending, by the one or more processors, a message to a client computing device of the passenger indicating that the autonomous vehicle is waiting in the vehicle queue to pick up the passenger at the designated spot, the message including the expected wait-time.

9. The method of claim 7, further comprising:
predicting, by the one or more processors based on the sensor data, an expected wait-time for the autonomous vehicle to reach the designated spot in the vehicle queue; and
providing, by the one or more processors based on the sensor data, a message to the passenger to wait for the autonomous vehicle to reach the designated spot before getting out of the autonomous vehicle, the message including the expected wait-time.

10. The method of claim 7, further comprising:
predicting, by the one or more processors based on the sensor data, an expected wait-time for the autonomous vehicle to reach the designated spot in the vehicle queue; and
predicting, by the one or more processors, an estimated arrival time for a passenger requesting pickup at the location to reach the designated spot,
wherein the time when the autonomous vehicle should join the vehicle queue is determined based on a comparison between the expected wait-time and the estimated arrival time.

11. The method of claim 10, further comprising:
determining, by the one or more processors based on the comparison between the expected wait-time and the estimated arrival time, that the autonomous vehicle should wait in a waiting area prior to joining the vehicle queue; and
controlling, by the one or more processors, the autonomous vehicle to park in the waiting area prior to joining the vehicle queue.

12. The method of claim 7, further comprising:
determining, by the one or more processors based on the sensor data, that loading or unloading outside the designated spot is tolerated by other vehicles in the vehicle queue; and
controlling, by the one or more processors, the autonomous vehicle to perform pickup or drop-off outside the designated spot.

13. The method of claim 7, further comprising:
determining, by the one or more processors upon reaching the designated spot in the vehicle queue, an amount of time to wait for the passenger at the designated spot; and
controlling, by the one or more processors, the autonomous vehicle to exit the vehicle queue after waiting the amount of time.

14. The method of claim 7, further comprising:
determining, by the one or more processors upon reaching the designated spot in the vehicle queue, an amount of time to wait for the passenger at the designated spot based on whether the autonomous vehicle is blocking traffic at the designated spot; and
controlling, by the one or more processors, the autonomous vehicle to exit the vehicle queue after waiting the amount of time.

15. The method of claim 7, further comprising:
determining, by the one or more processors upon reaching the designated spot in the vehicle queue, an estimated arrival time for the autonomous vehicle to reach the designated spot;
based on the estimated arrival time, controlling the autonomous vehicle to exit the vehicle queue;
predicting, by the one or more processors, an expected wait-time for the autonomous vehicle to reach the designated spot after exiting the vehicle queue;
determining, by the one or more processors to return to the vehicle queue after the autonomous vehicle exits the vehicle queue based on a comparison between the estimated arrival time and the expected wait-time; and
controlling, by the one or more processors, the autonomous vehicle to drive to return to the vehicle queue after exiting the vehicle queue.

16. The method of claim 15, further comprising:
sending, by the one or more processors, a message to a user device of the passenger indicating that the autonomous vehicle is returning to an end of the vehicle queue, the message including the expected wait-time.

17. The method of claim 15, further comprising:
determining, by the one or more processors based on the comparison between the estimated arrival time and the expected wait-time, that the autonomous vehicle should wait in a waiting area prior to returning to an end of the vehicle queue; and
controlling, by the one or more processors, the autonomous vehicle to park in the waiting area prior to returning to the end of the vehicle queue.

18. The method of claim 7, wherein the autonomous vehicle drives into a lane closest to the designated spot.

19. The method of claim 1, further comprising:
determining, by the one or more processors that the location has a plurality of designated pickup or drop-off areas;
selecting, by the one or more processors, one of the designated pickup or drop-off areas; and
controlling, by the one or more processors, the autonomous vehicle to drive to the selected one of the designated pickup or the drop-off areas.

20. The method of claim 19, wherein the selecting one of the designated pickup or drop-off areas is based on feedback received from a user device, the feedback associated with the passenger identifying a preferred spot for pickup or drop-off.

21. The method of claim 1, further comprising:
  determining, by the one or more processors, an amount of time that the autonomous vehicle should wait to pick up the passenger at the location before exiting the vehicle queue.

22. The method of claim 21, wherein the sensor data indicates whether a designated spot at the location blocks traffic, and the amount of time that the autonomous vehicle should wait to pick up the passenger at the location is determined based on whether the designated spot at the location blocks traffic.

23. The method of claim 1, further comprising:
  controlling, by the one or more processors, the autonomous vehicle to park in a waiting area prior to joining the vehicle queue.

24. A queue management system of an autonomous vehicle for controlling the autonomous vehicle to join a vehicle queue, the queue management system comprising:
  a perception system configured to detect a plurality of vehicles waiting in a line;
  a memory configured to store information; and
  one or more processors coupled to the perception system and the memory, the one or more processors configured to:
    access the information stored in the memory;
    receive information including a request for the autonomous vehicle to pick up or drop off a passenger at a location;
    determine, based on a schedule associated with the location, that the location is currently likely to have a vehicle queue to pick up or drop off passengers;
    receive sensor data from the perception system of the autonomous vehicle as the autonomous vehicle approaches the location;
    determine, based on the sensor data, whether a traffic pattern indicating that the vehicle queue actually exists at the location, the vehicle queue including a plurality of vehicles waiting in a line for at least one of picking up or dropping off passengers;
    when the vehicle queue actually exists, determine, based on the sensor data, a time when the autonomous vehicle should join the vehicle queue to wait in the line to pick up or drop off one or more passengers at the location; and
    control the autonomous vehicle to join the vehicle queue by joining the line and stopping behind a last one of the plurality of vehicles at the determined time to wait in the line to pick up or drop off the one or more passengers at the location.

25. The queue management system of claim 24, wherein the one or more processors are further configured to control the autonomous vehicle to park in a waiting area prior to joining the vehicle queue.

* * * * *